July 21, 1970     H. L. BOWDITCH     3,521,297

PNEUMATIC INDICATOR-RECORDER

Filed Nov. 1, 1968     5 Sheets-Sheet 1

INVENTOR.
HOEL L. BOWDITCH

BY Lawrence H. Poelon

AGENT

United States Patent Office 3,521,297
Patented July 21, 1970

3,521,297
PNEUMATIC INDICATOR-RECORDER
Hoel L. Bowditch, Foxboro, Mass., assignor to The Foxboro Company, Foxboro, Mass., a corporation of Massachusetts
Filed Nov. 1, 1968, Ser. No. 772,682
Int. Cl. G01d 15/00
U.S. Cl. 346—139     3 Claims

ABSTRACT OF THE DISCLOSURE

In instrumentation for process and/or energy control, a combination indicator-recorder with the indicator on the front, the recorder on the side at 90° to the indicator, both indicator arm and recorder pen being driven from a single pneumatic signal.

This invention relates to pneumatic instrumentation, and specifically, provides a unique, space-saving combination of recorder and controller.

The instrument of this invention may be of the order of front face dimensions of 3 by 6 inches. A vertically rectangular indicator assembly in the front is combined with a circular chart of the order of five inches in diameter on the side. The recorder is visible only when the instrument is partially removed from its support, usually a panel with other instruments therein, and the recorder is very useful for tuning purposes and trouble shooting in the instrument.

The combination of this invention provides at the same time, information as to past, present, and future conditions in the process or energy control to which the instrument is applied. The present and future information is in terms of the position and direction of indicator pointers in the front of the instrument, and the past in terms of a trend recorder on the side of the instrument.

This invention thus provides an indicator and a recorder at 90° with respect to each other, with pen arm and recorder pen both driven by the same pneumatic signal, in a single bellows, through a single linkage assembly.

Other objects and advantages of this invention will be in part apparent and in part pointed out hereinafter and in the accompanying drawings, wherein.

Figure 1:
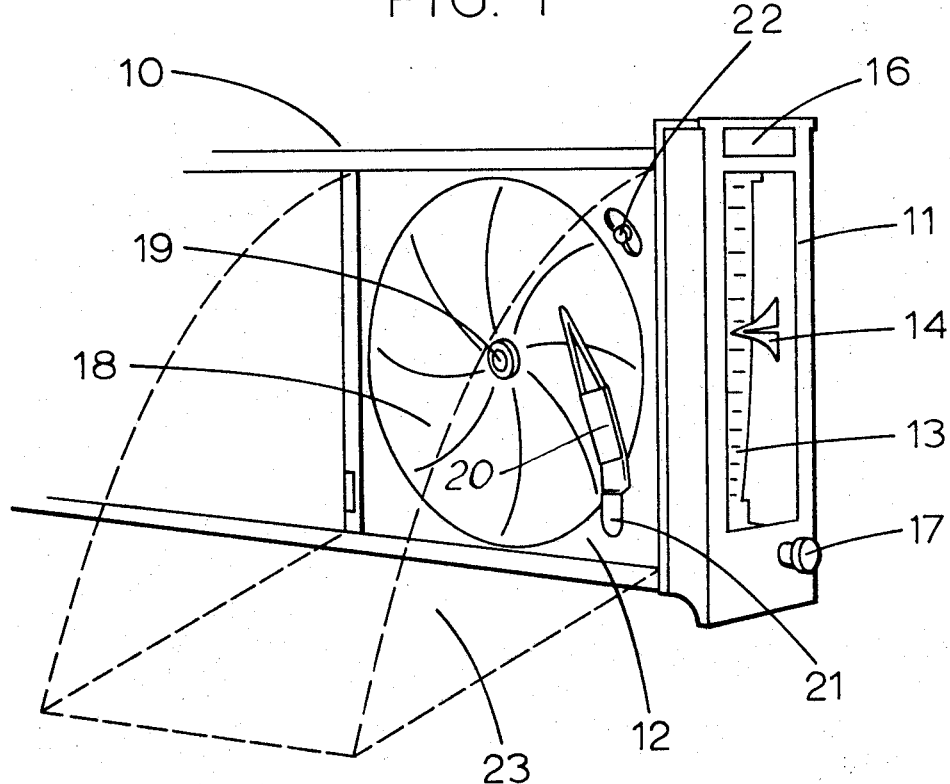
FIG. 1 is a perspective of the forward portion of an instrument embodying this invention.

In FIG. 1, the indicator-recorder instrument 10 is shown as a long and narrow housing having a front indicator portion 11, and a side recorder portion 12. The indicator portion includes an indicia scale 13 and a pointer therefor at 14. More than one pen may be used, in special forms and colors as disclosed hereinafter. The scale 13 is vertically narrow and rectangular in keeping with the shape of the instrument. The scale is convex to the front of the instrument and the indicator 14 follows the curve of that convexity through movement of an indicator arm 15, see other figures, about a horizontal pivot inside the instrument. The front of the instrument may also be provided with top panels 16 for alarm lights or associated indicators, and with adjustment knobs 17.

The FIG. 1 recorder portion 12 comprises a rotatable circular chart 18, mounted on an arbor 19, with a pen 20 movable across the chart as it rotates, the pen 20 being mounted on a rotatable arbor 21. A chart speed adjustment knob 22 has three positions; off, slow, and fast, and a transparent plastic access door 23 is hinged along the bottom side edge of the instrument.

Figure 2:
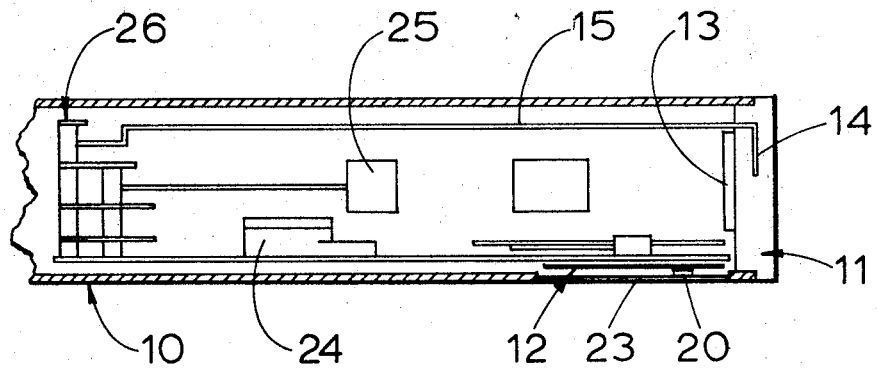
FIG. 2 is a top view, with top panel removed, of the structure of FIG. 1.

In FIG. 2, the chart recording system 12 is shown as a narrow vertical plate assembly along one side of the instrument. A chart drive motor 24 drives the arbor 19 of FIG. 1, and both the recording chart pen 20 and the indicator pointer 14 are simultaneously driven by a single pneumatic signal in a bellows 25, FIG. 2, through a single linkage assembly 26.

Figure 3:
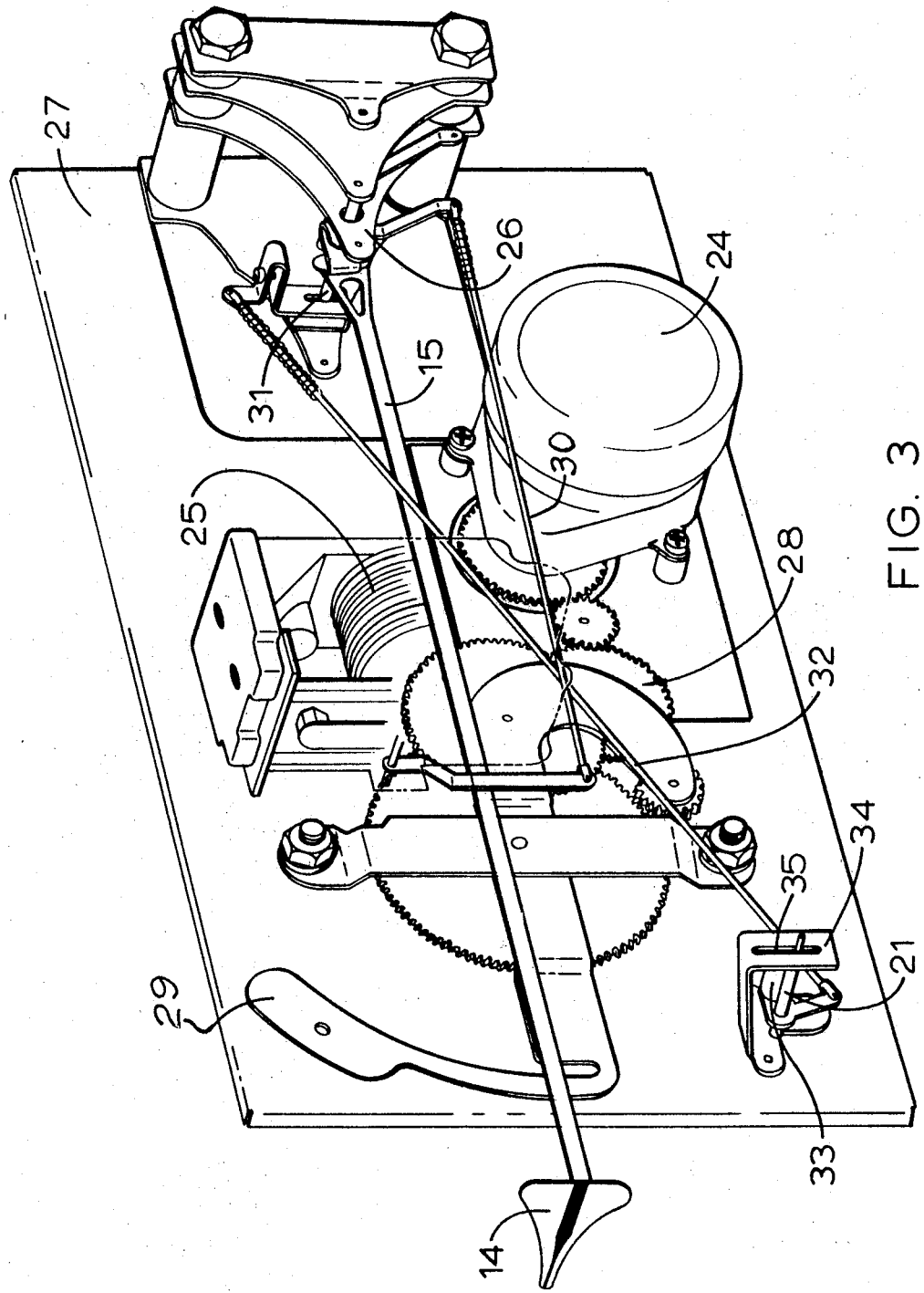
FIG. 3 is a perspective of the inner side of the panel of recorder-indicator structure according to this invention.

The FIG. 3 showing of the inner side of the recorder-indicator structure comprises a support plate 27 on which a gear train 28 is mounted, driven by the motor 24. Through operation of a shift lever 29 by adjustment of the knob 22, FIG. 1, pivoting of the shift lever changes the gear combinations to provide an off condition, and two different speeds. The fast speed gives a quick look at the signal variant, as a trend record.

The signal bellows 25 operates a linkage arm 30 to rotate an arbor 31. Rotation of this arbor pivots both the indicator arm 15 and, through linkage arm 32, the recorder pen arbor 21. The connection of the linkage arm 32 to the pen arbor 21 is counterweighted, as at 33, to hold the pen 20 against the chart.

Figure 4:
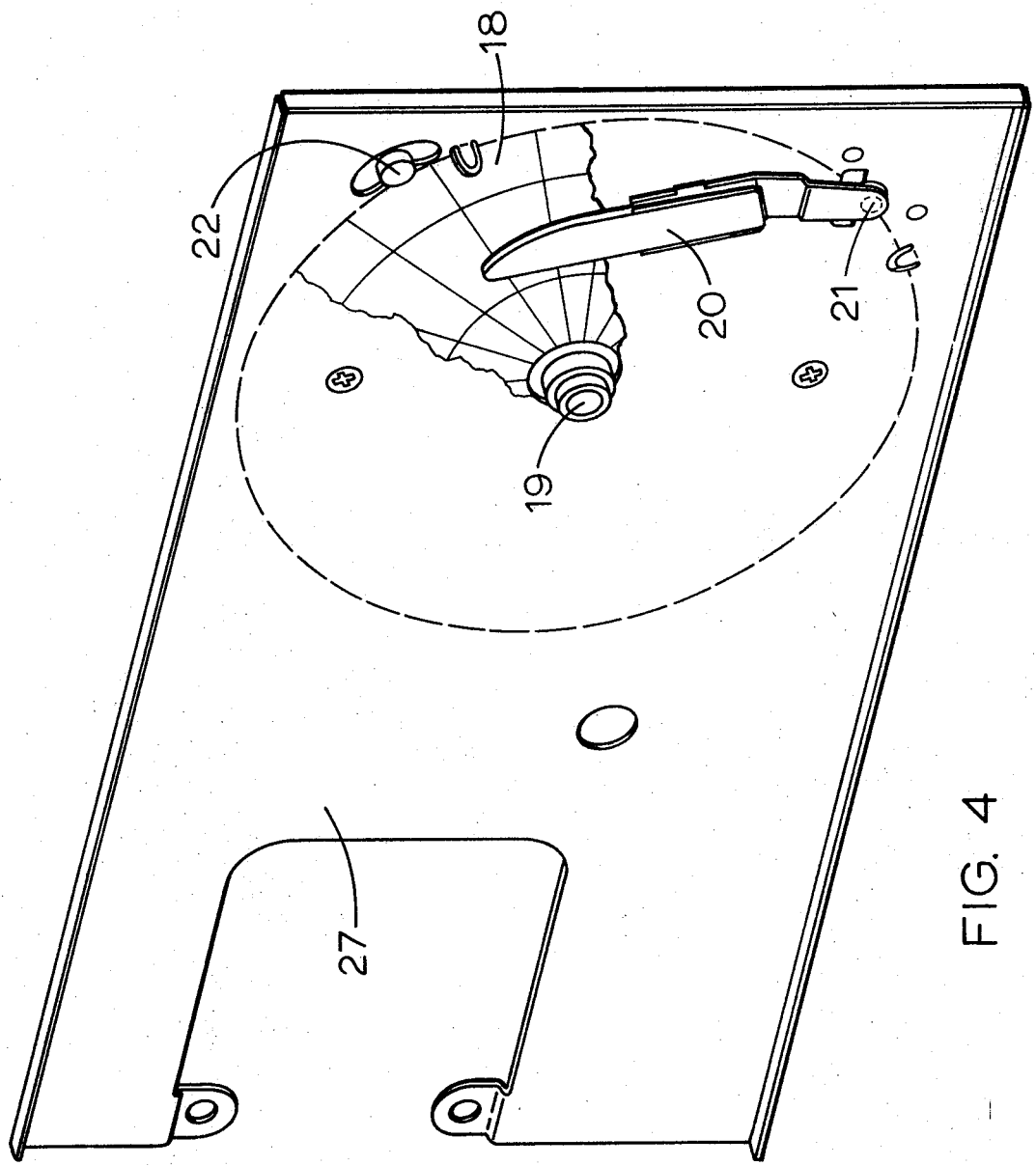
FIG. 4 is a perspective of the outer side of the panel of FIG. 3.
Figure 5A:
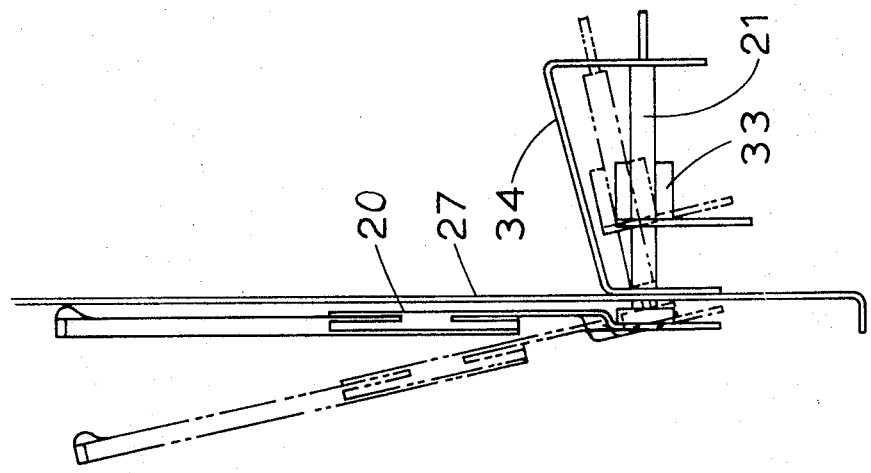
FIGS. 5 and 5A are developments of the recorder pen immediate structure.
Figure 5:
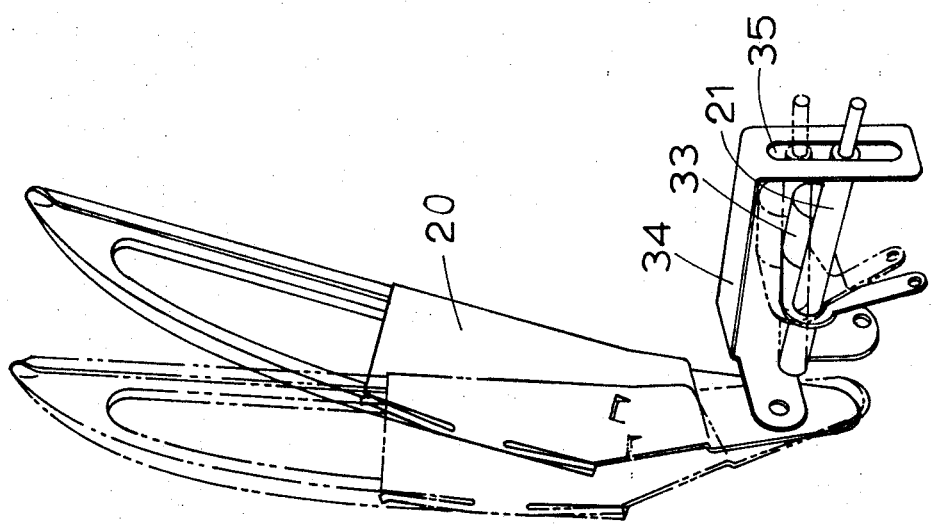

The support structure for the pen arbor 21 comprises an inverted U bracket 34, one leg of which is secured to the plate 27, the other leg having a vertical slot 35 to allow vertical movement of the arbor 21 as the pen 20 is lifted outward to provide room to change the chart. The pen end of the arbor 21 is pivotally formed and mounted with respect to the plate 27 and the bracket 34 such that the pen 22 and the arbor maintain a fixed right angle relation to each other as the pen is lifted off the chart. This structure and function is illustrated in FIGS. 4, 5, and 5A. FIG. 4 further shows the outer face of the support plate 27 and the recorder structure thereon.

In FIGS. 6 through 9, a double indicator pointer structure is illustrated, in different pointer positions. An adjustable set point pointer 36 is white, with a central black stripe to the apex of the pointer. The measurement indicator pointer 14, see previous figures, is red and like the set point pointer, concavely curved to its apex. The measurement pointer 14 and the side recorder pen 20, are simultaneously moved by the same pneumatic signal, as previously described herein.

Figure 6:
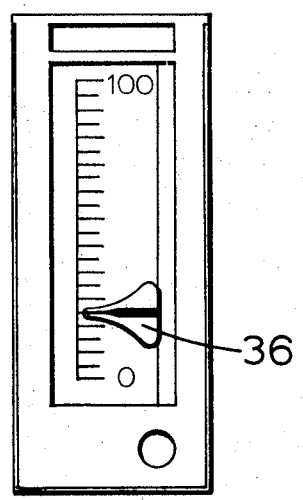
FIGS. 6 through 9 are various views of indicator scale and pointer positions according to this invention.
Figure 7:
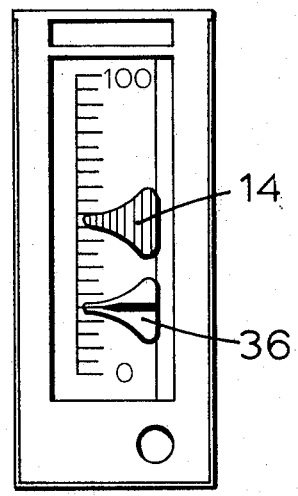

In FIG. 6, the measurement is right on the set point, and the red indicator is fully hidden behind the white indicator. In FIG. 7, there is a strong deviation, the red indicator is fully out from under the white indicator.

Figure 8:
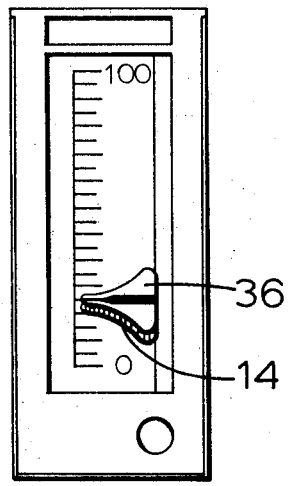
Figure 9:
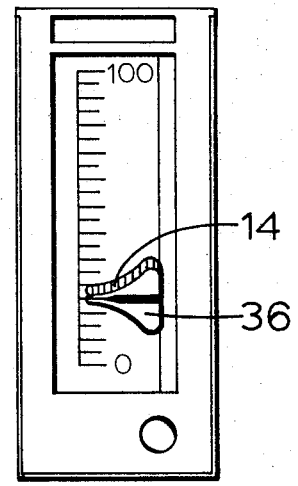

FIGS. 8 and 8 illustrate in different directions, the start of movement of the red indicator out from under the white indicator, that is, an indication of the future in that a continuance in the indicated directions could result in the undesirable situation of FIG. 7.

Thus the indicator system can indicate the actuality of measurement, as the present, and the potentiality of change and the direction thereof, as the future, while the recorder indicates the past, the trend, either fast or slowly, or can be used as a spot check device by keeping the recorder chart drive in off condition until needed.

This invention therefore provides a new and useful pneumatic instrument indicator-recorder with the indicator on the front and the recorder on the side of the instrument, with indicator arm and recorder pen both driven from a single bellows through a single linkage assembly.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. In a pneumatic instrument for use in process and/or energy control, the front of the instrument provided with indicator means, and the side of the instrument provided with recorder shaft means, a recorder chart on said shaft means, pen means for recording on said chart, a single linkage assembly for driving both said indicator means and said pen means, and a single signal bellows for driving said single linkage assembly, wherein said pen means includes a counterbalance pen support, with means for lifting the pen away from the chart, to provide room for changing charts, said lifting means comprising a pen arbor in a pivoted support at one end of said arbor adjacent the chart, and in a vertical arbor slot support at the other end of said arbor.

2. For use in process and/or energy control instrumentation to provide simultaneous information as to past, present, and future values of parameters or situation conditions of such instrumentation, in devices occupying small space and lending themselves to multiple instrument combinations in the handling of complex control systems, a combined indicator-recorder system for a pneumatic instrument, in the form of a long and narrow box-like structure, wherein one end face is a narrow rectangle as the front face of the instrument, for placement and alignment in a multiple instrument panel with other similarly shaped instruments, said front face being provided with indicator means for showing said present and future information, recorder chart means for said past information mounted on a side instrument, at right angles to said indicator means and normally out of sight when said instrument is fully mounted into said panel, means for simultaneously operating said indicator means and said chart means in representation of said process and/or energy values, and means for readily withdrawing said instrument from said panel for observation or servicing of said recorder chart means, wherein pen means for said recorder chart means is provided on a pivotable structure for movement away from the face of said chart means in a direction perpendicular to the plane of recording movement of said pen over said chart, said pivotable structure comprising a slot within which a drive arbor for said pen is mounted for lengthwise movement as said pen movement away from said chart is accomplished.

3. A combined indicator-recorder system according to claim 2, wherein said pen drive arbor is provided with a counter-weight.

References Cited

UNITED STATES PATENTS

| 1,069,594 | 8/1913 | Wurmb et al. | 346—137 |
| 2,915,356 | 12/1959 | Reilly | 346—17 |
| 3,434,152 | 3/1969 | Vogtlin | 346—145 X |

JOSEPH W. HARTARY, Primary Examiner